US00RE48626E

(19) United States
(12) Reissued Patent
Tetsuka

(10) Patent Number: US RE48,626 E
(45) Date of Reissued Patent: Jul. 6, 2021

(54) BICYCLE INPUT FORCE PROCESSING APPARATUS

(71) Applicant: Shimano, Inc., Sakai (JP)

(72) Inventor: Toshio Tetsuka, Ashiya (JP)

(73) Assignee: Shimano, Inc., Osaka (JP)

(21) Appl. No.: 14/644,855

(22) Filed: Mar. 11, 2015

Related U.S. Patent Documents

Reissue of:
(64) Patent No.: 8,833,182
Issued: Sep. 16, 2014
Appl. No.: 13/414,435
Filed: Mar. 7, 2012

(51) Int. Cl.

| | |
|---|---|
| ***H02K 7/18*** | (2006.01) |
| ***B60R 16/033*** | (2006.01) |
| ***B62J 11/19*** | (2020.01) |
| ***B60R 16/03*** | (2006.01) |
| ***G01L 3/02*** | (2006.01) |

(52) U.S. Cl.
CPC ..... *H02K 7/1846* (2013.01); *B60R 16/033* (2013.01); *B60R 16/0307* (2013.01); *B62J 11/19* (2020.02); *G01L 3/02* (2013.01)

(58) Field of Classification Search
CPC ..... G01L 5/00; G01L 5/0009; G01L 5/0019; G01L 5/28; G01L 5/0042; G01L 5/0047
USPC ..... 280/259; 73/862.632
See application file for complete search history.

(56) References Cited

U.S. PATENT DOCUMENTS 3,033,034 A * 5/1962 Ziggel ..... G01L 1/2206 338/5
3,743,041 A * 7/1973 Videon ..... G01G 19/12 177/136
3,853,000 A * 12/1974 Barnett ..... G01L 1/22 33/DIG. 13
4,042,049 A * 8/1977 Reichow ..... G01G 3/1406 177/137
4,064,744 A * 12/1977 Kistler ..... G01B 7/18 338/6
4,526,039 A * 7/1985 Ceccon ..... G01B 7/16 73/774
4,718,287 A * 1/1988 Mishliborsky ..... G01L 1/2243 177/211
4,789,035 A * 12/1988 Hamilton ..... G01L 1/2218 177/211
5,027,303 A 6/1991 Witte
5,423,224 A * 6/1995 Paine ..... G01B 7/16 73/765
5,539,158 A * 7/1996 Utsunomiya ..... G01L 1/2243 177/211

(Continued)

FOREIGN PATENT DOCUMENTS

CN 201201674 Y 3/2009
EP 1298051 A2 4/2003

(Continued)

*Primary Examiner* — Russell D Stormer
(74) *Attorney, Agent, or Firm* — James A. Deland

(57) ABSTRACT

A bicycle crank arm apparatus comprises a crank arm having a crank axle mounting portion and a pedal mounting portion. A circuit-mounting structure is disposed between the crank axle mounting portion and the pedal mounting portion, wherein the circuit-mounting structure is configured to detachably mount a measurement board. When a measurement board is mounted to the circuit-mounting structure, the resulting combination forms a bicycle input force processing apparatus.

22 Claims, 7 Drawing Sheets

(56) References Cited

U.S. PATENT DOCUMENTS

| | | | | |
|---|---|---|---|---|
| 5,591,908 | A * | 1/1997 | Reid | 73/379.07 |
| 5,992,553 | A * | 11/1999 | Morrison | 180/206.2 |
| 6,263,992 | B1 * | 7/2001 | Li | 180/206.3 |
| 6,407,350 | B1 * | 6/2002 | Blakesley | B60N 2/002 177/211 |
| 6,431,013 | B2 * | 8/2002 | Nonnenmacher | 73/862.632 |
| 6,644,135 | B1 | 11/2003 | Kishimoto et al. | |
| 7,047,817 | B2 * | 5/2006 | Lanham | 73/773 |
| 7,062,969 | B2 | 6/2006 | Ueda | |
| 7,174,277 | B2 | 2/2007 | Vock et al. | G01B 21/16 702/188 |
| 7,357,036 | B2 * | 4/2008 | Steprath | A01B 63/112 73/767 |
| 7,599,806 | B2 * | 10/2009 | Hauschildt | 702/44 |
| 7,806,006 | B2 | 10/2010 | Phillips et al. | |
| 7,861,599 | B2 | 1/2011 | Meggiolan | |
| 8,006,574 | B2 | 8/2011 | Meyer | |
| 8,011,242 | B2 * | 9/2011 | O'Neill et al. | G01L 3/242 73/379.01 |
| 8,117,923 | B2 | 2/2012 | Sasaki | |
| 8,141,438 | B2 * | 3/2012 | Roessingh et al. | 73/862.191 |
| 8,327,723 | B2 | 12/2012 | Roudergues et al. | |
| 8,387,470 | B2 * | 3/2013 | Tuulari et al. | 73/862.627 |
| 8,584,529 | B2 * | 11/2013 | Fisher et al. | 73/782 |
| 9,417,144 | B2 * | 8/2016 | Lull | G01L 3/242 |
| 2005/0178210 | A1 | 8/2005 | Lanham | |
| 2007/0245835 | A1 * | 10/2007 | Hauschildt | 73/862.391 |
| 2009/0120210 | A1 * | 5/2009 | Phillips et al. | 73/862.338 |
| 2010/0024590 | A1 | 2/2010 | O'Neill et al. | |
| 2010/0263468 | A1 | 10/2010 | Fisher et al. | |
| 2011/0239815 | A1 | 10/2011 | Grab et al. | |
| 2013/0233126 | A1 * | 9/2013 | Tetsuka | 74/594.1 |

FOREIGN PATENT DOCUMENTS

| | | | |
|---|---|---|---|
| EP | 2607223 | A1 | 6/2013 |
| WO | 2011063468 | A1 | 6/2011 |

* cited by examiner

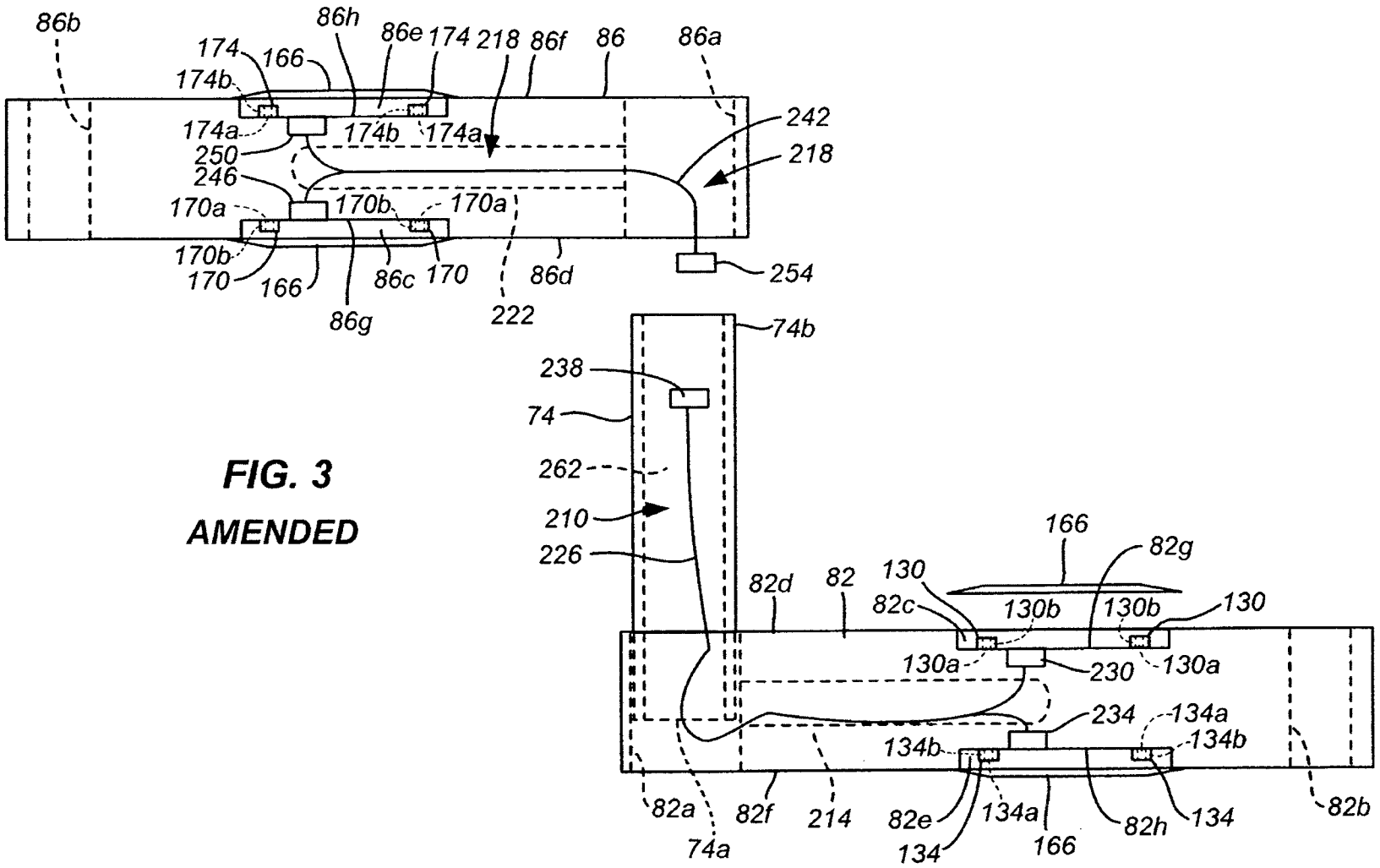
FIG. 3
AMENDED

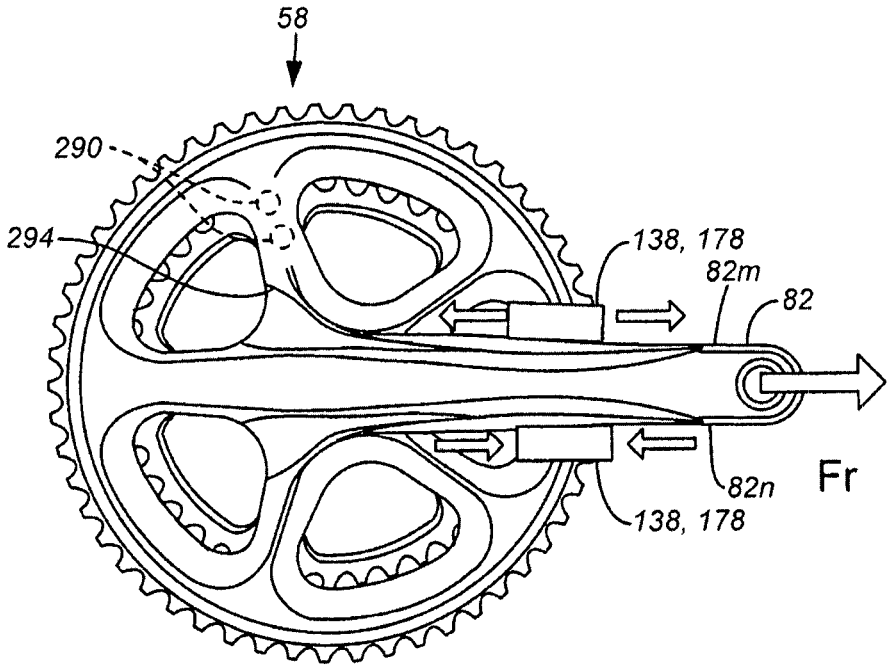
FIG. 10
AMENDED

BICYCLE INPUT FORCE PROCESSING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention is directed to bicycles and, more particularly, to various features of a bicycle input force processing apparatus.

Some bicycle components have sensors attached to them to measure various operating characteristics of the component. For example, transmission shift control devices may have position sensors attached to the operating cable winding mechanism in order to sense the current operating position of the operating cable winding member. The position of the operating cable winding member provides information about the current gear ratio of the bicycle transmission, and that information may be communicated to the rider through a display. In another example, a magnet may be mounted to one of the spokes of the bicycle wheel, and a sensor such as a reed switch may be mounted to the bicycle frame so that the magnet passes by the sensor upon every revolution of the wheel. As a result, the sensor produces an electrical pulse every time the magnet passes by the sensor, and the time between successive pulses may be used to determine the speed of the bicycle. In yet another example, a force sensor such as a strain gauge may be mounted to the surface of a component such as a pedal crank or a wheel hub in order to measure torque being applied to the component. The information from the sensor then may be used to calculate the effort exerted by the rider.

SUMMARY OF THE INVENTION

The present invention is directed to various features of a bicycle input force measuring apparatus. In one embodiment, a bicycle crank arm apparatus comprises a crank arm having a crank axle mounting portion and a pedal mounting portion. A circuit-mounting structure is disposed between the crank axle mounting portion and the pedal mounting portion, wherein the circuit-mounting structure is configured to detachably mount a measurement board. When a measurement board is mounted to the circuit-mounting structure, the resulting combination forms a bicycle input force processing apparatus. Additional inventive features will become apparent from the description below, and such features may be combined with the above features to provide additional benefits.

BRIEF DESCRIPTION OF THE DRAWINGS

FIG. 3 is a schematic view of particular embodiments of crank arms and a crank axle of the bicycle;

FIG. 10 is a schematic view of measurement board placement to measure a radial force.

DETAILED DESCRIPTION OF THE EMBODIMENTS

Figure 1:
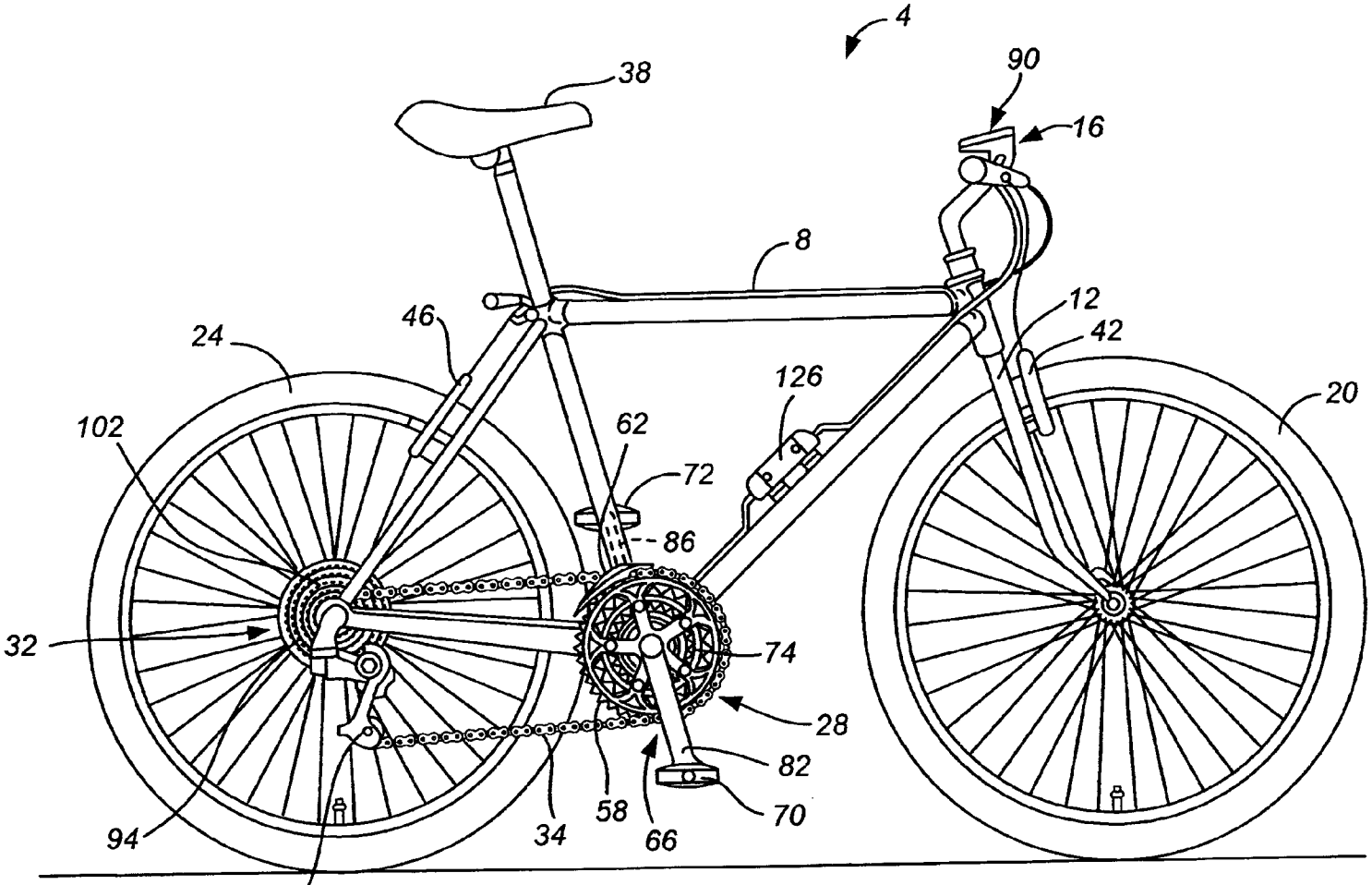
FIG. 1 is a side view of a bicycle that includes particular embodiments of electrically-controlled bicycle components.
Figure 2:
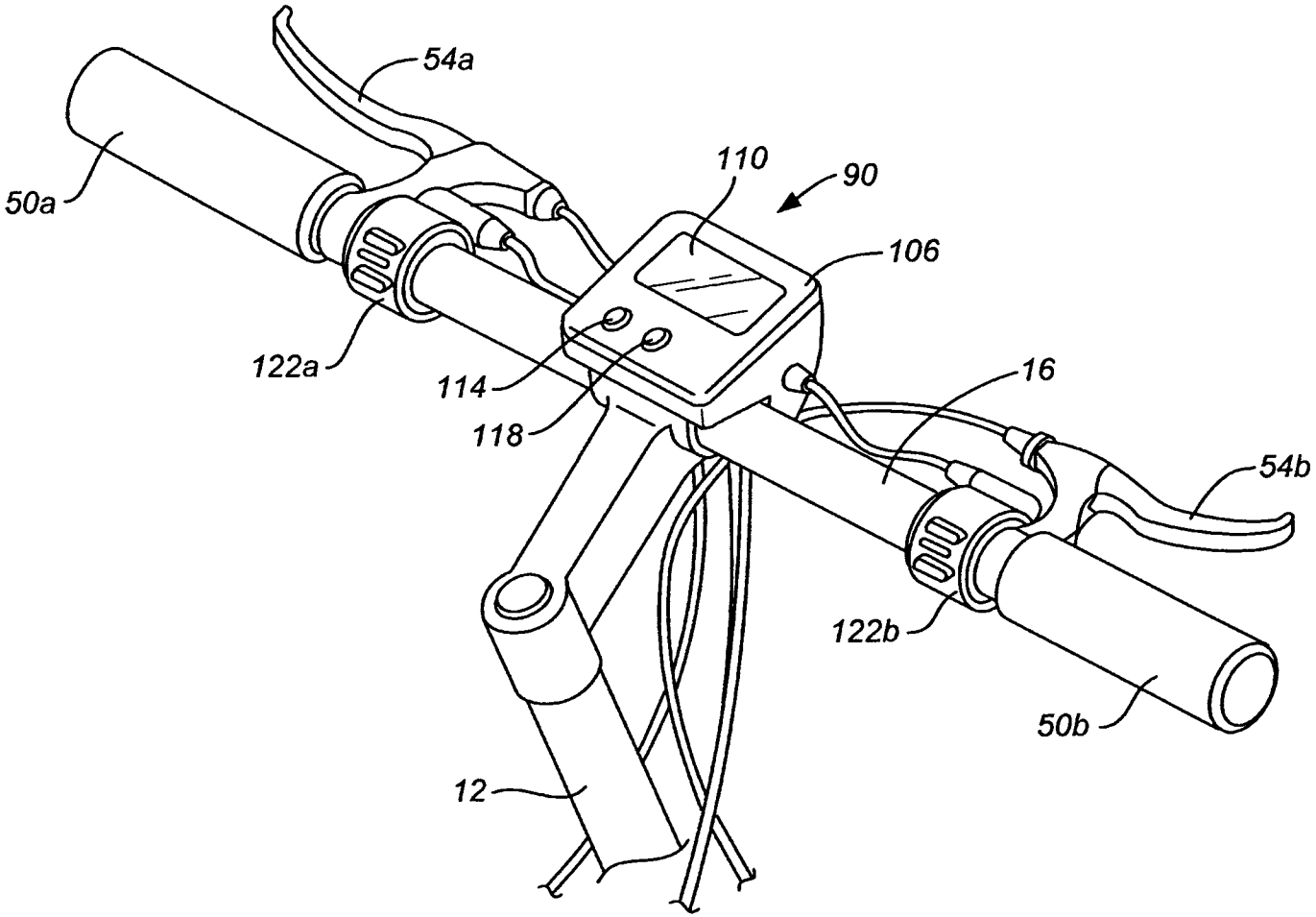
FIG. 2 is a detailed view of particular embodiments of handlebar-mounted components of the bicycle.

FIG. 1 is a side view of a bicycle 4 that includes particular embodiments of electrically-controlled components. Bicycle 4 is a sport bicycle such as a mountain bicycle, and it comprises a frame 8, a front fork 12 rotatably mounted to frame 8, a handlebar assembly 16 mounted to the upper part of fork 12, a front wheel 20 rotatably attached to the lower part of fork 12, a rear wheel 24 rotatably attached to the rear of frame 8, a front transmission 28, a rear transmission 32, a chain 34 operatively coupled to front transmission 28 and rear transmission 32, and a saddle 38. A front wheel brake 42 is provided for braking front wheel 20, and a rear wheel brake 46 is provided for braking rear wheel 24. As shown in FIG. 2, respective grips 50a, 50b and brake levers 54a, 54b are provided on both ends of handlebar assembly 16. Brake lever 54a is connected to front wheel brake 42 for braking front wheel 20, and brake lever 54b is connected to rear wheel brake 46 for braking rear wheel 24.

Front transmission 28 is a mechanical unit attached to the central lower part of frame 8 for transmitting drive force generated by the rider to rear transmission 32 via chain 34. Front transmission 28 comprises three sprockets 58 of various sizes and a front derailleur 62. The three sprockets 58 are installed on a gear crank 66 that is rotated when the rider pushes pedals 70 and 72. Gear crank 66 comprises a crank axle 74 that passes horizontally and rotatably through a bottom bracket of frame 8, a right crank arm 82, and a left crank arm 86. A first end portion of right crank arm 82 includes an axle-mounting opening 82a (FIG. 3) for mounting right crank arm 82 to crank axle 74, and a second end portion of right crank arm 82 includes a pedal-mounting opening 82b for mounting pedal 70. Sprockets 58 are attached to right crank arm 82. A first end portion of left crank arm 86 includes an axle-mounting opening 86a for mounting left crank arm 86 to crank axle 74, and a second end portion of left crank arm 86 includes a pedal-mounting opening 86b for mounting pedal 72. Front derailleur 62 selectively engages chain 34 with one of the three sprockets 58 and can be moved by a motor (not shown) that is controlled by a control unit 90 mounted to handlebar assembly 16.

Rear transmission 32 transmits the driving force from chain 34 to rear wheel 24. Rear transmission 32 comprises a rear sprocket cluster 94 and a rear derailleur 98. Rear sprocket cluster 94 comprises a plurality of sprockets 102 mounted concentrically with the hub portion of rear wheel 24. Rear derailleur 98 engages chain 34 with selected ones of sprockets 102 and can be moved by a motor (not shown) that is controlled by control unit 90.

As shown in FIG. 2, control unit 90 includes a box-like housing 106. A display unit 110, a power switch 114, and a mode switch 118 are arranged on the upper surface of housing 106. Shift command units 122a, 122b are provided inwardly of grips 50a, 50b and brake levers 54a, 54b, respectively, and control unit 90 is operatively is connected to shift command units 122a, 122b. Shift command units 122a, 122b are used for shifting front transmission 28 and rear transmission 32, respectively. Control unit 90 is connected to front transmission 28 and to rear transmission 32 by a connector unit 126 (FIG. 1).

As shown in FIG. 3, in this embodiment *a circuit-mounting structure having* a first circuit-mounting opening 82c is formed at a laterally inner side surface 82d of crank arm 82, and *a circuit-mounting structure having* a second circuit-mounting opening 82e is formed at a laterally outer side surface 82f of crank arm 82. First circuit-mounting opening 82c and second circuit-mounting opening 82e include respective bottom floors 82g and 82h so that first circuit-mounting opening 82c and second circuit-mounting opening 82e are formed as recesses in laterally inner side surface 82d and laterally outer side surface 82f, respectively.

As used herein, the inner side means the side of the crank arm that faces the bicycle frame when the crank arm is attached to the bicycle, the outer side means the side of the crank arm that faces away from the bicycle frame, the upper side means the side of the crank arm that faces upwardly when the crank arm is oriented generally horizontally with the outer side of the crank arm facing the viewer and the axle-mounting opening on the left, and the lower side means the side of the crank arm that faces downwardly when the crank arm is oriented generally horizontally with the outer side of the crank arm facing the viewer and the axle-mounting opening on the left.

First circuit-mounting structures 130 are disposed within first circuit-mounting opening 82c, and second circuit-mounting structures 134 are disposed within second circuit-mounting opening 82e. First and second circuit-mounting structures 130 and 134 are configured to detachably mount corresponding measurement boards 138 (FIGS. 4 and 5) to crank arm 82 at the respective first and second circuit-mounting openings 82c and 82e. First and second circuit-mounting structures 130 and 134 may be formed as continuous, one-piece structures with crank arm 82, or they may be separate structures welded to or otherwise bonded or fastened to crank arm 82. In this embodiment, first and second circuit-mounting structures 130 and 134 are structured as cylindrical pillars or some other forms of projections or protuberances. Preferably, but not necessarily, first and second circuit-mounting structures 130 and 134 may include further circuit-mounting openings 130a and 134a containing further circuit-mounting structures in the form of threads 130b and 134b. In other words, first circuit-mounting structures 130 and second circuit-mounting structures may be formed as threaded nuts.

Figure 5:
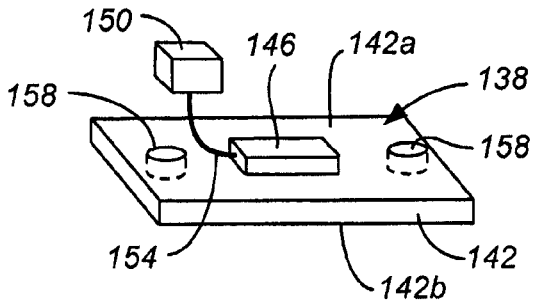
FIG. 5 is a perspective view of a particular embodiment of a measurement board.

As shown in FIG. 5, measurement board 138 may comprise a substrate 142 having a top surface 142a and a bottom surface 142b, a sensor 146 disposed at top surface 142a for measuring an input force, an electrical connector 150 electrically connected to sensor 146 through wiring 154, and mounting openings 158 in the form of through holes. Substrate 142 may be a printed circuit board or a semiconductor, metal or other conductive or nonconductive rigid or flexible sheet. In this embodiment, sensor 146 comprises a strain gauge (e.g., a plurality of resistors configured as a Wheatstone bridge) that may be affixed to substrate 142 or formed as part of substrate 142. Sensor 146 may be formed at least in part from a semiconductor material to detect the strain on substrate 142. Of course, other configurations of sensor 146 and substrate 142 will be readily understood depending upon the material used.

Figure 4:
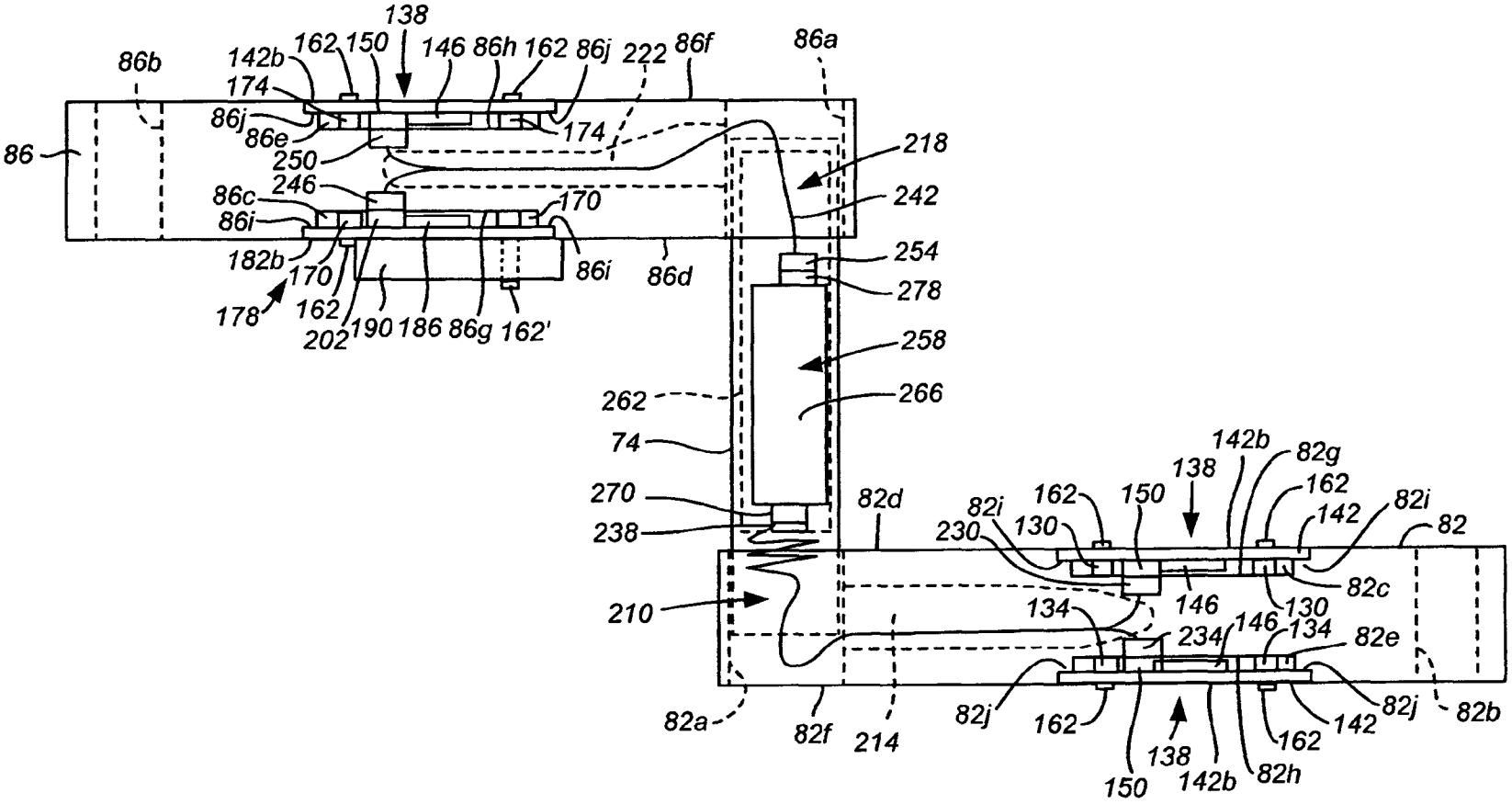
FIG. 4 is a schematic view of particular embodiments of measurement boards and a power source mounted to the crank arms and to the crank axle, respectively.

As shown in FIG. 4, each measurement board 138 may be detachably mounted to its corresponding first or second circuit-mounting structures 130 or 134 using threaded fasteners such as screws 162 that extend through mounting openings 158 in substrate 142 and into their corresponding first or second circuit-mounting structures 130 or 134. If desired, first and second circuit-mounting openings 82c and 82e may have stepped portions 82i and 82j so that measurement boards 138 are disposed within their respective mounting openings 82c and 82e, and bottom surfaces 142b of measurement boards 138 are flush with their corresponding inner side surface 82d and outer side surface 82f of crank arm 82. As shown in FIG. 3, detachable covers 166 may cover first and second circuit-mounting openings 82c and 82e when a measurement board 138 is not mounted in a corresponding first or second circuit-mounting opening 82c or 82e. In this embodiment, mounting openings 82c and 82e may be sealed by their respective measurement boards 138.

As shown in FIG. 3, in this embodiment *a circuit-mounting structure having* a first circuit-mounting opening 86c is formed at a laterally inner side surface 86d of crank arm 86, and *a circuit-mounting structure having* a second circuit-mounting opening 86e is formed at a laterally outer side surface 86f of crank arm 86. First circuit-mounting opening 86c and second circuit-mounting opening 86e include respective bottom floors 86g and 86h so that first circuit-mounting opening 86c and second circuit-mounting opening 86e are formed as recesses in laterally inner side surface 86d and laterally outer side surface 86f respectively. First circuit-mounting structures 170 are disposed within first circuit-mounting opening 86c, and second circuit-mounting structures 174 are disposed within second circuit-mounting opening 86e. First and second circuit-mounting structures 170 and 174 may be formed as continuous, one-piece structures with crank arm 86, or they may be separate structures welded to or otherwise bonded or fastened to crank arm 86. In this embodiment, as with first and second circuit-mounting structures 130 and 134 in crank arm 82, first and second circuit-mounting structures 170 and 174 are structured as cylindrical pillars or some other forms of projections or protuberances with further circuit-mounting openings 170a and 174a containing further circuit-mounting structures in the form of threads 170b and 174b.

Figure 6:
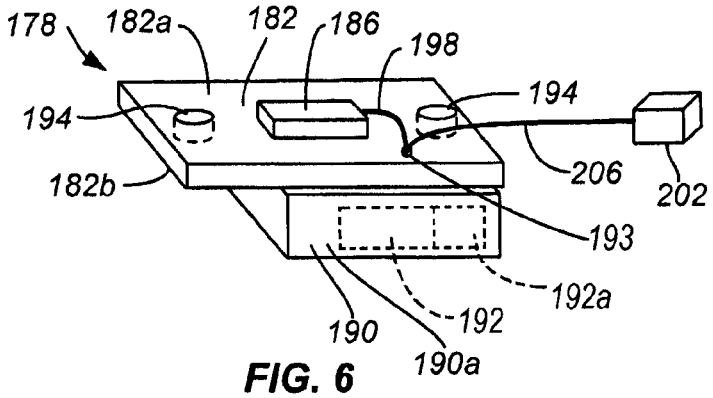
FIG. 6 is a perspective view of another embodiment of a measurement board with an attached control and communication circuit.

As shown in FIG. 4, first circuit-mounting structures 170 are configured to detachably mount a measurement board 178 (FIG. 6) to laterally inner side surface 86d of crank arm 86 at first circuit-mounting opening 86c, and second circuit-mounting structures 174 are configured to detachably mount a previously-described measurement board 138 to laterally outer side surface 86f of crank arm 86 at second circuit-mounting opening 86e. As shown in FIG. 6, measurement board 178 may comprise a substrate 182 having a top surface 182a and a bottom surface 182b, a sensor 186 disposed at top surface 182a for measuring an input force, a control and communication part 190 mounted to bottom surface 182b, and mounting openings 194 in the form of through holes. A similar through hole (not shown) that aligns with the right-side mounting opening 194 is disposed in control and communication part 190. Control and communication part 190 comprises a housing 190a and control and communication circuitry 192 inside housing 190a. Housing 190a may be made of resin to facilitate the transmission of electromagnetic waves therethrough. Control and communication part 190 may be disposed on top surface 182a of substrate 182, in which case substrate 182 or crank arm 86 may be made of a non-metallic material, or control and communication part 190 may be disposed on bottom surface 182b of substrate 182.

As with measurement board 138, substrate 182 may be a printed circuit board or a semiconductor, metal or other conductive or nonconductive rigid or flexible sheet. Sensor 186 comprises a strain gauge (e.g., a plurality of resistors configured as a Wheatstone bridge) that may be affixed to substrate 182 or formed as part of substrate 182. Sensor 186 may be formed at least in part from a semiconductor material to detect the strain on substrate 182. Sensor 186 is operatively coupled to control and communication part 190 through wiring 198, and an electrical connector 202 is electrically connected to control and communication part 190 through wiring 206. Wiring 198 206 pass through a through-hole 193 in substrate 182.

Control and communication circuitry 192 may include a microprocessor programmed to calculate force or power applied to crank arms 82 and 86 in a well-known manner based on the signals received from sensors 146 and 186. Control and communication circuitry 192 also includes a transmitter 192a to transmit sensor signals and/or calculated data wirelessly to control unit 90.

As shown in FIG. 4, measurement board 178 may be detachably mounted to first circuit-mounting structures 170 using threaded fasteners such as screws 162 that extend through mounting openings 194 in substrate 182 (as well as through the aligned opening in control and communication part 190) and into first circuit-mounting structures 170, and measurement board 138 may be detachably mounted to second circuit-mounting structures 174 using threaded fasteners such as screws 162 that extend through mounting openings 158 in substrate 142 and into second circuit-mounting structures 174. If desired, first and second circuit-mounting openings 86c and 86e may have respective stepped portions 86i and 86j so that measurement boards 178 and 138 are disposed within their respective mounting openings 86c and 86e, and the bottom surfaces 182b and 142b of respective measurement boards 178 and 138 are flush with their corresponding inner side surface 86d and outer side surface 86f of crank arm 86. As shown in FIG. 3, detachable covers 166 may cover first and second circuit-mounting openings 86c and 86e when a measurement board 178 or 138 is not mounted at its corresponding first or second circuit-mounting opening 86c or 86e.

As shown in FIGS. 3 and 4, a first wiring harness 210 is disposed at least partially within a hollow chamber 214 in crank arm 82, and a second wiring harness 218 is disposed at least partially within a hollow chamber 222 in crank arm 86. First wiring harness 210 comprises a wiring bundle 226, a first electrical connector 230, a second electrical connector 234, and a third electrical connector 238. In this embodiment, first electrical connector 230 is rigidly mounted to bottom floor 82g of first circuit-mounting opening 82c so as to be exposed to first circuit-mounting opening 82c, and second electrical connector 234 is rigidly mounted to bottom floor 82h of second circuit-mounting opening 82e so as to be exposed to second circuit-mounting opening 82e. Electrical connector 150 of measurement board 138 at first circuit-mounting opening 82c is connected to first electrical connector 230, and electrical connector 150 of measurement board 138 at second circuit-mounting opening 82e is connected to second electrical connector 234. If desired, first electrical connector 230 and second electrical connector 234 may form first and second circuit-mounting structures alone or in combination with their respective first and second circuit-mounting structures 130 and 134, especially if one or both of the electrical connectors 150 are rigidly mounted to their corresponding substrates 142. Hollow chamber 214, first circuit-mounting opening 82c and second circuit-mounting opening 82e may be in fluid communication with each other (i.e., form a continuous opening).

Similarly, second wiring harness 218 comprises a wiring bundle 242, a first electrical connector 246, a second electrical connector 250, and a third electrical connector 254. In this embodiment, first electrical connector 246 is rigidly mounted to bottom floor 86g of first circuit-mounting opening 86c so as to be exposed to first circuit-mounting opening 86c, and second electrical connector 250 is rigidly mounted to bottom floor 86h of second circuit-mounting opening 86e so as to be exposed to second circuit-mounting opening 86e. Electrical connector 202 of measurement board 178 at first circuit-mounting opening 86c is connected to first electrical connector 246, and electrical connector 150 of measurement board 138 at second circuit-mounting opening 86e is connected to second electrical connector 250. If desired, first electrical connector 246 and second electrical connector 250 may form first and second circuit-mounting structures alone or in combination with their respective first and second circuit-mounting structures 170 and 174, especially if electrical connector 202 is rigidly mounted to its corresponding substrate 182 and/or if electrical connector 150 is rigidly mounted to its corresponding substrate 142. Hollow chamber 222, first circuit-mounting opening 86c and second circuit-mounting opening 86e may be in fluid communication with each other (i.e., form a continuous opening).

Figure 7:
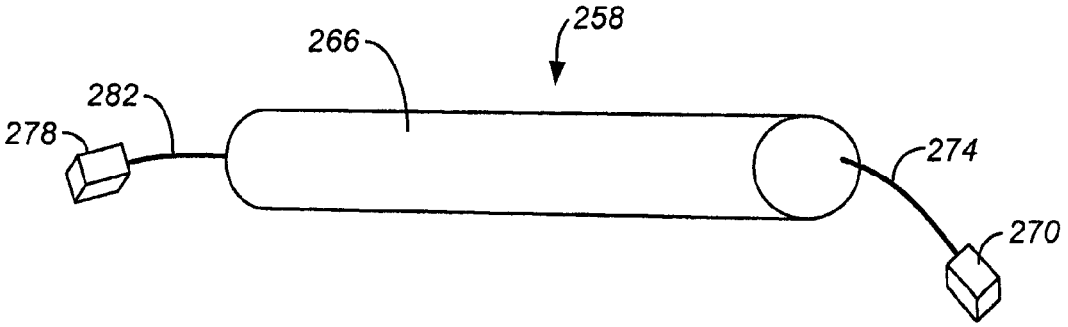
FIG. 7 is a perspective view of a particular embodiment of a power source.

As shown in FIGS. 4 and 7, a power source such as a battery unit 258 is disposed within a hollow chamber 262 in crank axle 74. Battery unit 258 comprises a cylindrical battery housing 266 that houses a plurality of individual battery cells (not shown), a first electrical connector 270 coupled to battery housing 266 through wiring 274, and a second electrical connector 278 coupled to battery housing 266 through wiring 282. First electrical connector 270 is connected to third electrical connector 238 of first wiring harness 210 for communicating operating power to measurement boards 138 at first and second circuit-mounting openings 82c and 82e of right crank 82 and for communicating sensor signals from sensors 146 on measurement boards 138 at first and second circuit-mounting openings 82c and 82e through bypass wiring (not shown) in battery housing 266. Second electrical connector 278 is connected to third electrical connector 254 of second wiring harness 218 for communicating operating power to measurement boards 178 and 138 at first and second circuit-mounting openings 86c and 86e of left crank 86 and for communicating sensor signals from sensors 146 on measurement boards 138 at first and second circuit-mounting openings 82c and 82e of right crank 82 to control and communication part 190. Wiring harness 218 also communicates sensor signals from sensor 146 on measurement board 138 at second circuit-mounting opening 86e of left crank 86 to control and communication part 190.

Figure 8:
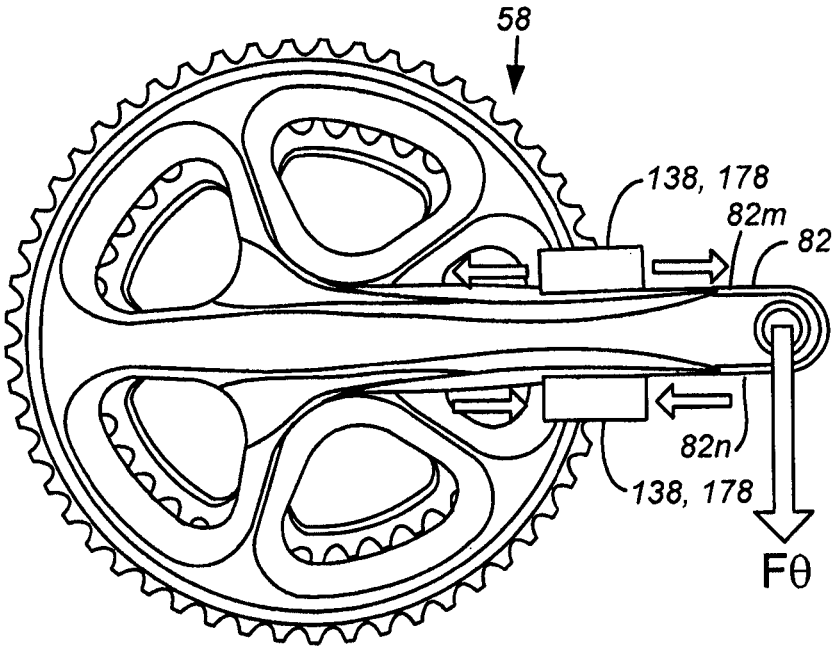
FIG. 8 is a schematic view of measurement board placement to measure a driving torque.
Figure 9:
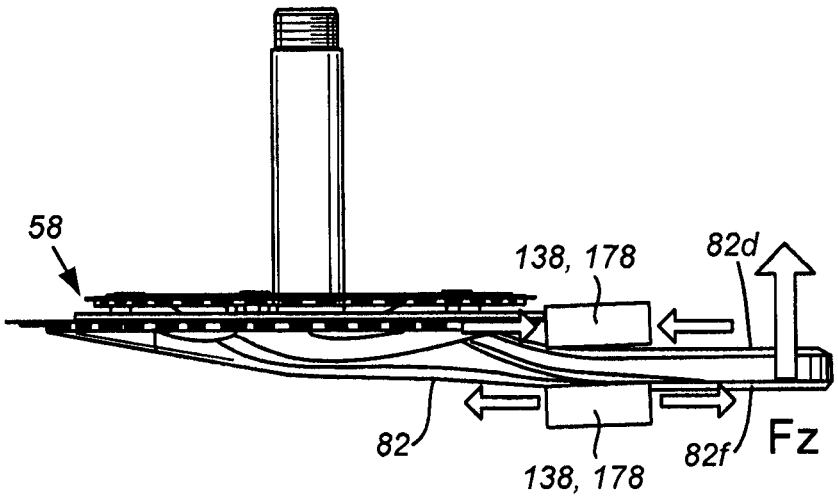
FIG. 9 is a schematic view of measurement board placement to measure an out-of-plane force.
Figure 11:
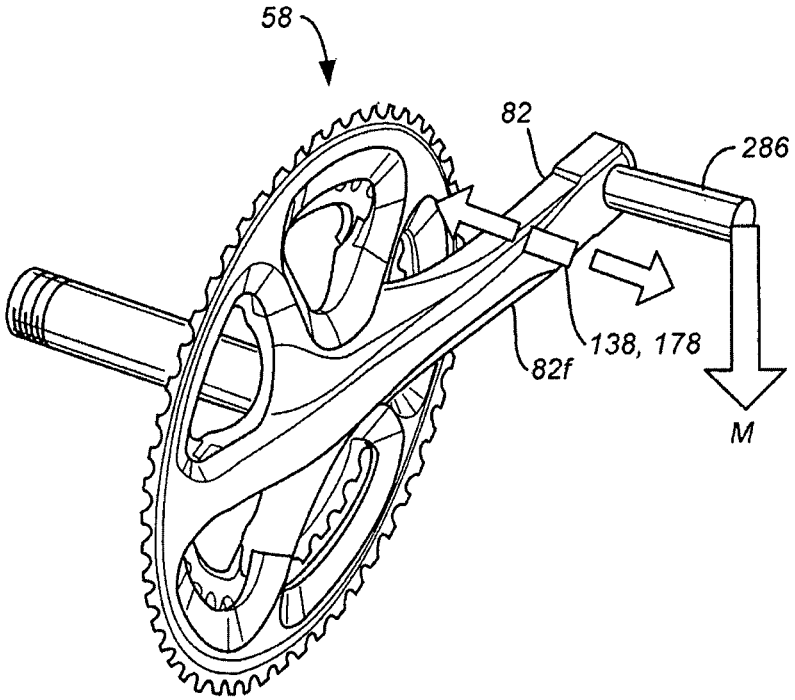
FIG. 11 is a schematic view of measurement board placement to measure a torsional moment force.

The sensor mounting arrangements disclosed herein have many uses. For example, as shown in FIG. 8, driving torque $F_\theta$ may be detected and processed by mounting measurement boards 138 (or 178) as shown on upper and lower side surfaces 82m, 82n of crank arm 82 so that the sensor mounted *on measurement board 138* (*or 178*) on upper side surface 82m detects tension (indicated by arrows) and the sensor mounted *on measurement board 138* (*or 178*) on the lower side surface 82n detects compression. As shown in FIG. 9, out-of-plane forces $F_z$ may be detected and processed by mounting measurement boards 138 (or 178) as shown on laterally inner and outer side surfaces 82d, 82f of crank arm 82 so that the sensor mounted *on measurement board 138* (*or 178*) on inner side surface 82d detects compression and the sensor mounted *on measurement board 138* (*or 178*) on the outer side surface 82f detects tension (or vice versa). As shown in FIG. 10, forces $F_r$ directed radially outwardly along the longitudinal axis of crank arm 82 may be detected and processed by mounting measurement boards 138 (or 178) as shown on upper and lower side surfaces 82m, 82n of crank arm 82 so that the sensor mounted *on measurement board 138* (*or 178*) on upper side surface 82m detects tension and the sensor mounted *on measurement board 138* (*or 178*) on the lower side surface 82n detects compression. As shown in FIG. 11, torsional moment forces M (caused by a pedal axle 286) may be detected and processed by mounting a measurement board 138 (or 178) diagonally as shown on laterally outer side surface 82f of crank arm 82 to detect diagonally-oriented tensile forces.

While the above is a description of various embodiments of inventive features, further modifications may be employed without departing from the spirit and scope of the present invention. For example, while first and second wiring harnesses 210 and 218 were disposed within hollow chambers 214 and 222 of crank arms 82 and 86, respectively, first and second wiring harnesses 210 and 218 could be molded directly into the corresponding first and second crank arms 82 or 86. Alternatively, first and second wiring harnesses 210 and 218 could be partially or entirely disposed outside of first and second crank arms 82 and 86, and connectors 150 and 202 need not be rigidly affixed to the bottom floors of their respective circuit-mounting openings. Likewise, battery unit 258 could be disposed partially or entirely outside of crank axle 78.

Circuit mounting openings 82c, 82e, 86c and 86e may be omitted, and measurement boards 138 and/or 178 may be mounted to circuit mounting structures such as protuberances, circuit mounting structures (e.g., threads) disposed in circuit mounting openings at the side of the crank arm, circuit mounting structures disposed at connectors mounted to the crank arm, etc. While measurement boards 138 and/or 178 were mounted to right crank 82 and/or left crank 86, measurement boards 138 and/or 178 may be mounted to any such circuit mounting structures 290 (FIG. 10), with or without corresponding recesses, disposed on a sprocket mounting arm (spider arm) 294 associated with right crank 82. While measurement boards 138 and 178 were illustrated with one sensor 146 and 186 each, measurement boards 138 and 178 may include multiple sensors each.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

[1. A bicycle crank arm apparatus comprising:

a crank arm having a crank axle mounting portion and a pedal mounting portion; and a circuit-mounting structure disposed between the crank axle mounting portion and the pedal mounting portion, wherein the circuit-mounting structure is configured to detachably mount a measurement board having a sensor mounted thereon for measuring an input force.]

[2. The apparatus according to claim 1 wherein the circuit mounting structure has an opening.]

3. The apparatus according to claim [2] *34* further comprising a cover that detachably mounts to *the circuit-mounting* opening.

[4. The apparatus according to claim 2 further comprising an electrical connector disposed at the opening, wherein the connector is configured to detachably connect to another electrical connector.]

5. The apparatus according to claim [4] *34* wherein the electrical connector is disposed within the *circuit-mounting* opening.

6. The apparatus according to claim 5 wherein the electrical connector is fastened to the crank arm within the *circuit-mounting* opening.

[7. The apparatus according to claim 4 further comprising electrical wiring attached to the electrical connector.]

[8. The apparatus according to claim 7 wherein the electrical wiring is disposed within the crank arm.]

[9. The apparatus according to claim 1 wherein the crank arm includes a sprocket-mounting arm, and wherein the circuit-mounting structure is disposed on the sprocket-mounting arm.]

[10. A bicycle input force processing apparatus comprising:

a crank arm having a crank axle mounting portion and a pedal mounting portion; and a first measurement board having a first sensor mounted thereon for measuring a first input force;

wherein the crank arm includes a first circuit-mounting structure disposed between the crank axle mounting portion and the pedal mounting portion and configured to detachably mount the first measurement board.]

11. The apparatus according to claim [10] *26* wherein the first sensor comprises a strain gauge.

12. The apparatus according to claim [10] *26* wherein the first measurement board includes a surface facing the crank arm, and wherein the sensor is disposed between the surface and the crank arm.

13. The apparatus according to claim [10] *26* wherein the *first* circuit mounting structure has [an] *a first circuit-mounting* opening.

14. The apparatus according to claim 13 wherein the first measurement board is mounted within the *first circuit-mounting* opening.

15. The apparatus according to claim 14 wherein the *first circuit-mounting* opening includes a bottom floor so that the *first circuit-mounting* opening is formed as a recess in the crank arm.

16. The apparatus according to claim [10] *26* further comprising a fastener that mounts the first measurement board to the first circuit-mounting structure.

17. The apparatus according to claim 16 wherein the fastener comprises a threaded fastener.

18. The apparatus according to claim [10] *26* further comprising a transmitter operatively coupled to the first sensor for transmitting sensor signals.

19. The apparatus according to claim 18 wherein the transmitter wirelessly transmits the sensor signals.

20. The apparatus according to claim 18 wherein the transmitter is mounted to the first measurement board.

[21. The apparatus according to claim 10 wherein the first measurement board includes a first electrical connector, and wherein the crank arm includes a second electrical connector structured to detachably connect to the first electrical connector.]

[22. The apparatus according to claim 21 wherein the second electrical connector is disposed at the opening.]

[23. The apparatus according to claim 21 further comprising electrical wiring attached to the second electrical connector.]

[24. The apparatus according to claim 23 wherein the electrical wiring is disposed within the crank arm.]

[25. The apparatus according to claim 23 further comprising a power source connected to the electrical wiring.]

26. [The apparatus according to claim 25 further comprising] *A bicycle input force processing apparatus comprising:*

*a crank arm having a crank axle mounting portion and a pedal mounting portion; and*

*a first measurement board having a first sensor mounted thereon for measuring a first input force applied to the first measurement board by the crank arm;*

*wherein the crank arm includes a first circuit-mounting structure disposed between the crank axle mounting portion and the pedal mounting portion and configured to detachably mount the first measurement board;*

*wherein the first measurement board includes a first electrical connector;*

*wherein the crank arm includes a second electrical connector structured to detachably connect to the first electrical connector;*

*electrical wiring attached to the second electrical connector;*

*a power source connected to the electrical wiring; and* a crank axle structured to be mounted to the crank axle mounting portion, wherein the crank axle includes a hollow portion, and wherein the power source is disposed within the hollow portion.

27. The apparatus according to claim 26 wherein the power source is structured to be detachably connected to the electrical wiring at both ends of the crank axle.

28. The apparatus according to claim [10] *26* wherein the crank arm includes a second circuit-mounting structure, and further comprising a second measurement board having a second sensor mounted thereon for measuring a second input force *applied to the second measurement board by the crank arm*, wherein the second circuit-mounting structure is configured to detachably mount the second measurement board.

29. The apparatus according to claim 28 wherein the first measurement board is disposed at a laterally inner side of the crank arm, and wherein the second measurement board is disposed at a laterally outer side of the crank arm.

30. The apparatus according to claim 28 wherein the first measurement board is disposed at an upper side of the crank arm, and wherein the second measurement board is disposed at a lower side of the crank arm.

*31. A bicycle crank arm apparatus comprising:*

*a crank arm having a crank axle mounting portion and a pedal mounting portion;*

*a circuit-mounting structure disposed between the crank axle mounting portion and the pedal mounting portion, wherein the circuit-mounting structure is configured to detachably mount a measurement board having a sensor mounted thereon for measuring an input force applied to the measurement board by the crank arm;*

*an electrical connector disposed at the circuit-mounting structure, wherein the electrical connector is configured to detachably connect to another electrical connector; and*

*electrical wiring attached to the electrical connector;*

*wherein the electrical wiring extends from the circuit-mounting structure into a hollow chamber formed in the crank arm;*

*wherein the electrical wiring extends from the hollow chamber out of the crank arm; and*

*wherein the electrical wiring extends out of the hollow chamber through the crank axle mounting portion of the crank arm.*

*32. The apparatus according to claim 31 wherein the circuit mounting structure has a circuit-mounting opening.*

*33. The apparatus according to claim 31 wherein the electrical connector is rigidly mounted to the crank arm.*

*34. The apparatus according to claim 32 wherein the electrical connector is disposed at a bottom floor of the circuit-mounting opening.*

* * * * *